(12) United States Patent
Brown et al.

(10) Patent No.: US 10,330,551 B2
(45) Date of Patent: *Jun. 25, 2019

(54) PASS-THROUGHS FOR USE WITH SENSOR ASSEMBLIES, SENSOR ASSEMBLIES INCLUDING AT LEAST ONE PASS-THROUGH AND RELATED METHODS

(71) Applicant: Quartzdyne, Inc., Salt Lake City, UT (US)

(72) Inventors: G. Scott Brown, Eagle Mountain, UT (US); K. Robert Harker, West Jordan, UT (US); Scott S. Merkley, Eagle Mountain, UT (US)

(73) Assignee: Quartzdyne, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,804

(22) Filed: Apr. 17, 2018

(65) Prior Publication Data

US 2018/0238759 A1  Aug. 23, 2018

Related U.S. Application Data

(62) Division of application No. 14/924,033, filed on Oct. 27, 2015, now Pat. No. 9,964,459.

(Continued)

(51) Int. Cl.
*G01L 11/04* (2006.01)
*E21B 47/06* (2012.01)
(Continued)

(52) U.S. Cl.
CPC ............ *G01L 11/04* (2013.01); *E21B 47/011* (2013.01); *E21B 47/06* (2013.01); *E21B 47/065* (2013.01);
(Continued)

(58) Field of Classification Search
CPC ..... G01L 9/0008; G01L 9/0022; G01L 11/04; E21B 47/06; E21B 47/12
(Continued)

(56) References Cited

U.S. PATENT DOCUMENTS

| 3,561,832 A | 2/1971 | Karrer et al. |
| 3,617,780 A | 11/1971 | Benjaminson et al. |

(Continued)

FOREIGN PATENT DOCUMENTS

| CA | 2467313 A1 | 11/2004 |
| CA | 2591619 A1 | 11/2004 |

(Continued)

OTHER PUBLICATIONS

French Search Report and Written Opinion for French Application No. 1560503, dated Feb. 13, 2018, 7 pages.

(Continued)

*Primary Examiner* — Benjamin R Schmitt
(74) *Attorney, Agent, or Firm* — TraskBritt

(57) ABSTRACT

Transducer assemblies may include a sensor and a housing including a pass-through portion comprising at least one aperture in a portion of the housing extending along a longitudinal axis of the housing and the sensor. Methods of forming transducer assemblies may include welding a first housing section of the transducer assembly to a second housing portion of the transducer assembly and forming at least one aperture in the first housing section extending along a longitudinal axis of the transducer assembly, along a chamber for holding a sensor, and through the weld.

19 Claims, 6 Drawing Sheets

Related U.S. Application Data

(60) Provisional application No. 62/074,517, filed on Nov. 3, 2014.

(51) Int. Cl.
 *G01L 9/00* (2006.01)
 *E21B 47/01* (2012.01)

(52) U.S. Cl.
 CPC .......... *G01L 9/0022* (2013.01); *G01L 9/0033* (2013.01); *G01L 9/0041* (2013.01)

(58) Field of Classification Search
 USPC ................. 73/152.22, 125.27, 152.51, 702
 See application file for complete search history.

(56) References Cited

U.S. PATENT DOCUMENTS

| | | | |
|---|---|---|---|
| 4,550,610 A | 11/1985 | EerNisse | |
| 4,689,999 A | 9/1987 | Shkedi | |
| 5,231,880 A | 8/1993 | Ward et al. | |
| 5,303,773 A | 4/1994 | Czemichow et al. | |
| 5,471,882 A | 12/1995 | Wiggins | |
| 5,836,200 A | 11/1998 | Belonenko et al. | |
| 5,928,494 A | 7/1999 | Kato et al. | |
| 6,009,216 A | 12/1999 | Pruett et al. | |
| 6,131,462 A | 10/2000 | EerNisse et al. | |
| 6,886,638 B2 | 5/2005 | Ahmed et al. | |
| 6,888,972 B2 | 5/2005 | Berg et al. | |
| 6,919,512 B2 | 7/2005 | Guven et al. | |
| 6,966,228 B2 | 11/2005 | Binet et al. | |
| 7,216,719 B2 | 5/2007 | Ahmed et al. | |
| 7,340,819 B2 | 3/2008 | Guven et al. | |
| 7,712,524 B2 | 5/2010 | Patel et al. | |
| 7,735,555 B2 | 6/2010 | Patel et al. | |
| 7,775,275 B2 | 8/2010 | Patel | |
| 7,793,718 B2 | 9/2010 | Patel | |
| 7,817,062 B1 | 10/2010 | Li et al. | |
| 7,836,959 B2 | 11/2010 | Howard et al. | |
| 7,890,273 B2 | 2/2011 | Lovell et al. | |
| 7,896,070 B2 | 3/2011 | Lovell | |
| 7,913,773 B2 | 3/2011 | Li et al. | |
| 8,028,571 B2 | 10/2011 | Besson | |
| 8,056,619 B2 | 11/2011 | Patel et al. | |
| 8,082,983 B2 | 12/2011 | Patel et al. | |
| 8,082,990 B2 | 12/2011 | Lovell et al. | |
| 8,146,658 B2 | 4/2012 | Howard et al. | |
| 8,195,398 B2 | 6/2012 | Lovell et al. | |
| 8,235,127 B2 | 8/2012 | Patel et al. | |
| 8,312,923 B2 | 11/2012 | Patel et al. | |
| 8,333,117 B2 | 12/2012 | Brown et al. | |
| 8,548,743 B2 | 10/2013 | Lovell | |
| 8,757,276 B2 | 6/2014 | Alff et al. | |
| 9,540,917 B2 | 1/2017 | Stone et al. | |
| 2005/0279442 A1 | 12/2005 | Guven et al. | |
| 2007/0030167 A1 | 2/2007 | Li et al. | |
| 2007/0227727 A1 | 10/2007 | Patel et al. | |
| 2009/0151935 A1 | 6/2009 | Lovell et al. | |
| 2009/0173493 A1 | 7/2009 | Hutin et al. | |
| 2010/0116550 A1 | 5/2010 | Hutin et al. | |
| 2010/0200291 A1 | 8/2010 | Patel et al. | |
| 2011/0191031 A1 | 8/2011 | Harman et al. | |
| 2011/0229071 A1 | 9/2011 | Vincelette et al. | |
| 2012/0013482 A1 | 1/2012 | Patel et al. | |
| 2012/0306581 A1 | 12/2012 | Godager | |
| 2012/0323494 A1 | 12/2012 | Lovell et al. | |
| 2013/0220029 A1 | 8/2013 | Gardner et al. | |
| 2014/0174714 A1 | 6/2014 | Patel et al. | |
| 2014/0278155 A1 | 9/2014 | EerNisse et al. | |
| 2015/0007650 A1 | 1/2015 | Rose et al. | |
| 2015/0059483 A1 | 3/2015 | Puccio et al. | |

FOREIGN PATENT DOCUMENTS

| | | |
|---|---|---|
| CA | 2724709 A1 | 11/2004 |
| CA | 2492608 C | 5/2009 |
| EP | 1915504 B1 | 6/2010 |
| GB | 2382474 B | 12/2003 |
| GB | 2412340 A | 9/2005 |
| GB | 2402559 B | 11/2005 |
| WO | 2008060769 A2 | 5/2008 |
| WO | 2010025025 A1 | 3/2010 |
| WO | 2011006083 A1 | 1/2011 |

OTHER PUBLICATIONS

ICTA, International Coiled Tubing Association presents an Introduction to Coiled Tubing History, Applications and Benefits, www.icota.com, (2005), 32 pages.

PASS-THROUGHS FOR USE WITH SENSOR ASSEMBLIES, SENSOR ASSEMBLIES INCLUDING AT LEAST ONE PASS-THROUGH AND RELATED METHODS

CROSS-REFERENCE TO RELATED APPLICATION

This application is a divisional of U.S. patent application Ser. No. 14/924,033, filed Oct. 27, 2015, now U.S. Pat. No. 9,964,459, issued May 8, 2018, which claims the benefit of U.S. Provisional Patent Application Ser. No. 62/074,517, filed Nov. 3, 2014, the disclosure of each of which is hereby incorporated herein in its entirety by this reference.

TECHNICAL FIELD

Embodiments of the present disclosure relate to pass-throughs for use with sensor assemblies and, more particularly, to pass-throughs utilized to bypass one or more portions of a sensor assembly and related assemblies and associated methods.

BACKGROUND

Thickness shear mode quartz resonator sensors have been used successfully in the downhole environment of oil and gas wells for several decades and are an accurate means of determining downhole pressures in widespread use in hydrocarbon (e.g., oil and gas) exploration and production, as well as in other downhole applications. Quartz resonator pressure sensors typically have a crystal resonator located inside a housing exposed to ambient bottomhole fluid pressure and temperature. Electrodes on the resonator element coupled to a high frequency power source drive the resonator and result in shear deformation of the crystal resonator. The electrodes also detect the resonator response to pressure and temperature and are electrically coupled to conductors extending to associated power and processing electronics isolated from the ambient environment. Ambient pressure and temperature are transmitted to the resonator, via a substantially incompressible fluid within the housing, and changes in the resonator frequency response are sensed and used to determine the pressure and/or temperature and interpret changes in same. For example, a quartz resonator sensor, as disclosed in U.S. Pat. Nos. 3,561,832 and 3,617,780, includes a cylindrical design with the resonator formed in a unitary fashion in a single piece of quartz. End caps of quartz are attached to close the structure.

Generally, a pressure transducer comprising a thickness shear mode quartz resonator sensor assembly may include a first sensor in the form of a primarily pressure sensitive thickness shear mode quartz crystal resonator exposed to ambient pressure and temperature, a second sensor in the form of a temperature sensitive quartz crystal resonator exposed only to ambient temperature, a third reference crystal in the form of quartz crystal resonator exposed only to ambient temperature, and supporting electronics. The first sensor changes frequency in response to changes in applied external pressure and temperature with a major response component being related to pressure changes, while the output frequency of the second sensor is used to temperature compensate temperature-induced frequency excursions in the first sensor. The reference crystal, if used, generates a reference signal, which is only slightly temperature-dependent, against or relative to which the pressure-induced and temperature-induced frequency changes in the first sensor and the temperature-induced frequency changes in the second sensor can be compared. Such comparison may be achieved by, for example, frequency mixing frequency signals and using the reference frequency to count the signals from the first and second sensors for frequency measurement.

Prior art devices of the type referenced above including one or more thickness shear mode quartz resonator sensors exhibit a high degree of accuracy even when implemented in an environment such as a downhole environment exhibiting high pressures and temperatures. However, when implemented as pressure sensors, the sensors in these devices must be at least partially exposed to the exterior environment surrounding the device. For example, when implemented in a downhole environment, the sensors may be exposed to pressures up to about 30,000 psi (about 206.84 MPa) and temperatures of up to 200° C. Accordingly, in order to comply with such extreme pressure and temperature environments and shifts in pressure and temperature, the housings of such devices enclosing the sensors must be designed and manufactured to be substantially robust as to not fail when implemented in the field exposed to such pressures and temperatures.

For example, where pressure transducers are required to at least partially expose one or more pressure sensors within the pressure transducer to the pressure of the external environment (e.g., via a fluid within the sensor), the housing of the transducer must be designed to enable the pressure sensors to be in communication with pressure of the external environment while still maintaining structural integrity and protecting other components of the transducer, such as, for example, reference sensors, temperature sensors, and other electronics in the transducer from the surrounding extreme pressure and temperature environments. In some implementations, it is required to pass connections, such as electrical conductors, along the length of the transducer and past the pressure sensors from one component to another component within or external to the transducer. Thus, passing the electrical conductors past each pressure sensor may be difficult as such connections must be routed through or around portions of one or more pressure housings having the pressure sensors therein and that are equipped to handle the forces from pressures and temperatures of a downhole environment.

BRIEF SUMMARY

In some embodiments, the present disclosure includes a transducer assembly. The transducer assembly includes at least one sensor and a housing having a longitudinal axis. The housing includes a sensor housing portion at least partially enclosing the at least one sensor in a chamber in the sensor housing portion and a pass-through portion comprising at least one aperture in a portion of the housing extending along the longitudinal axis and the sensor housing portion.

In additional embodiments, the present disclosure includes a transducer assembly. The transducer assembly includes at least one sensor and a housing having a longitudinal axis. The housing includes a sensor housing portion at least partially enclosing the at least one sensor in a chamber in the sensor housing portion where the chamber is at least partially offset from the longitudinal axis of the housing and a pass-through portion comprising at least one aperture in a portion of the housing extending along the longitudinal axis and the sensor housing portion.

In additional embodiments, the present disclosure includes a transducer assembly. The transducer assembly includes at least one pressure sensor, an electronics assembly, and a housing having a longitudinal axis. The housing includes a pressure housing at least partially enclosing the at least one pressure sensor in a chamber in the pressure housing. The pressure housing includes a thick wall portion positioned on one lateral side of the pressure housing where the thick wall portion has a lateral width taken in a direction transverse to the longitudinal axis of the housing that is greater than a lateral width taken in the direction transverse to the longitudinal axis of the housing of another wall portion of the pressure housing positioned on another lateral side of the pressure housing. The housing further includes an electronics housing having the electronics assembly disposed therein and a pass-through portion comprising at least one aperture in the thick wall portion of the pressure housing and extending along the longitudinal axis of the housing and the pressure housing. The transducer assembly further includes at least one electrical connection electronically coupled to the electronics assembly where the at least one electrical connection extends through the at least one aperture of the pass-through portion to the electronics assembly.

In additional embodiments, the present disclosure includes a method of forming a transducer assembly. The method includes welding a first section of the transducer assembly to a second section of the transducer assembly with a width of the weld selected to exceed a required width by a selected dimension, the required width selected in view of one or more of a maximum external pressure and a maximum external temperature to which the transducer is designed to handle during use, and forming at least one aperture in a housing of the transducer assembly extending along a longitudinal axis of the housing and through the weld, the at least one aperture exhibiting a width substantially less than or equal to the selected dimension.

In yet additional embodiments, the present disclosure includes a method of forming a transducer assembly. The method includes welding a first housing section of the transducer assembly exhibiting a thick wall portion positioned on one lateral side of a chamber for receiving a pressure sensor to a second housing portion of the transducer assembly, the thick wall portion of the first housing section having a lateral width taken in a direction transverse to a longitudinal axis of the transducer assembly that is greater than a lateral width taken in the direction transverse to the longitudinal axis of the transducer assembly of another wall portion, and forming at least one aperture in the thick wall portion of the first housing section extending along the longitudinal axis of the transducer assembly, along the chamber, and through the weld.

In yet additional embodiments, the present disclosure includes sensors and related assemblies and methods of forming and operating sensors and related assemblies as described below.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure provided with reference to the accompanying drawings, in which:

DETAILED DESCRIPTION

In the following detailed description, reference is made to the accompanying drawings that depict, by way of illustration, specific embodiments in which the disclosure may be practiced. However, other embodiments may be utilized, and structural, logical, and configurational changes may be made without departing from the scope of the disclosure. The illustrations presented herein are not meant to be actual views of any particular sensor, transducer, assembly, or component thereof, but are merely idealized representations that are employed to describe embodiments of the present disclosure. The drawings presented herein are not necessarily drawn to scale unless otherwise indicated. Additionally, elements common between drawings may retain the same numerical designation.

Although some embodiments of sensors of the present disclosure are depicted as being used and employed in pressure transducer assemblies utilizing one or more quartz resonator sensors, persons of ordinary skill in the art will understand that the embodiments of the present disclosure may be employed in any assembly or system for measurement of an environment external to one or more sensors where the one or more sensors are at least partially exposed (e.g., in communication with) the exterior environment.

Figure 1:
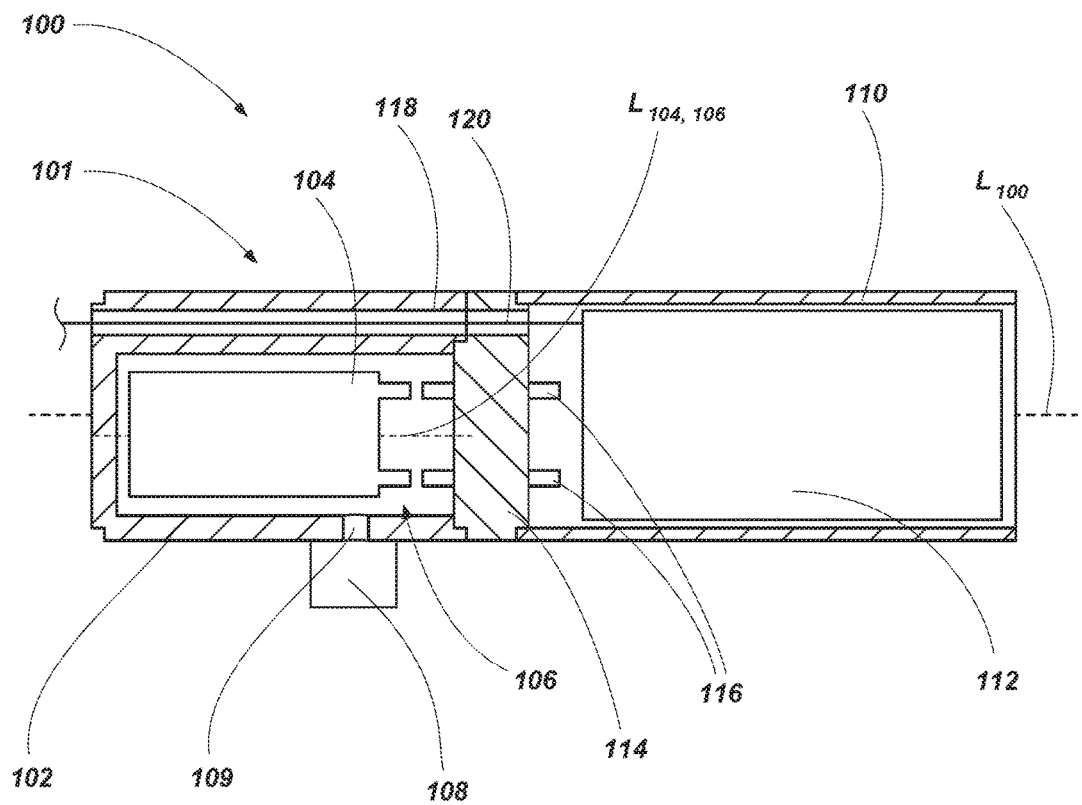
FIG. 1 is a partial cross-sectional simplified schematic view of a transducer assembly in accordance with an embodiment of the present disclosure.

FIG. 1 is a partial cross-sectional simplified schematic of a transducer assembly (e.g., pressure transducer 100) including a housing 101. As shown in FIG. 1, the housing 101 of the pressure transducer 100 includes a first portion (e.g., pressure housing 102) for holding one or more sensors that are at least partially exposed (e.g., entirely exposed, exposed to the pressure and/or temperature of the exterior environment). For example, the pressure transducer 100 may include one or more pressure sensors 104 (e.g., a quartz crystal resonating sensor) disposed in a chamber 106 in the pressure housing 102 that are exposed to the pressure and/or the temperature of the exterior environment.

The chamber 106 in the pressure housing 102 may be in communication with an environment exterior to the pressure transducer 100 in order to determine one or more environmental conditions in the exterior environment (e.g., pressure and/or temperature of the exterior environment). For example, the chamber 106 may be in fluid communication with one or more isolation elements 108 (e.g., a diaphragm assembly, a bladder assembly, a bellows assembly, as well as combinations of the foregoing). In some embodiments, isolation element 108 may be configured as a port 109 that is in communication with an exterior environment or fluid where the port 109 may be at least partially isolated proximate the housing 101 (e.g., with a diaphragm disposed in the port 109) or at a location away from the housing 101 (e.g., along a fluid channel extending from the housing 101). The isolation element 108 acts to transmit pressure and/or temperature exterior to the pressure transducer 100 to sensors within the pressure transducer 100 (e.g., via a fluid within the pressure transducer 100). Fluid may be disposed in the chamber 106 around the pressure sensor 104 and, optionally, in the isolation element 108 (e.g., in a bellows) to transmit the pressure and/or temperature from the exterior of the pressure transducer 100. In some embodiments, the fluid within pressure transducer 100 may comprise a highly incompressible, low thermal expansion fluid such as, for example, oil (e.g., a PARATHERM® or sebacate oil). The pressure and thermal expansion of the fluid may be sensed by the pressure sensor 104 (e.g., a quartz crystal sensing element).

As depicted in FIG. 1 and discussed below in greater detail, the pressure sensor 104 may be positioned along a longitudinal axis $L_{100}$ of the pressure transducer 100. In some embodiments, one or more of the pressure sensor 104 and the chamber 106 may be partially offset (from the longitudinal axis $L_{100}$ of the pressure transducer 100. For example, a longitudinal axis $L_{104}$ (e.g., a centerline) of the pressure sensor 104 and/or a longitudinal axis $L_{106}$ (e.g., a centerline) of the chamber 106 may be laterally offset from the longitudinal axis $L_{100}$ (e.g., centerline) of the pressure transducer 100 (e.g., in a direction transverse to, e.g., perpendicular to, the longitudinal axis $L_{100}$). In some embodiments, one or more of the pressure sensor 104, the chamber 106, and the pressure transducer 100 may have a substantially elliptical (e.g., an ellipse) or circular (e.g., annular, cylindrical) shape and/or cross section and the one or more of the pressure sensor 104 and the chamber 106 may have a centerline that is laterally offset from a centerline of the pressure transducer 100. In other embodiments, one or more of the pressure sensor 104 and the chamber 106 may be substantially aligned with the longitudinal axis $L_{100}$ of the pressure transducer 100. For example, the longitudinal axes $L_{104}$, $L_{106}$ of one or both of the pressure sensor 104 and the chamber 106 may be substantially aligned with the longitudinal axis $L_{100}$ of the pressure transducer 100.

An electronics housing 110 is coupled to the pressure housing 102 (e.g., via spacer 114). As depicted, the electronics housing 110 includes an electronics assembly 112 that is at least partially isolated from the fluid within the chamber 106 in the pressure housing 102, which is in communication with the exterior environment. The electronics assembly 112 may be electrically coupled to the pressure sensor 104 in the pressure transducer 100 via electrical connections (e.g., feedthrough pins 116 that extend through the spacer 114) and may be utilized to operate (e.g., drive) one or more of the pressure sensor 104 and to receive the output of the pressure sensor 104.

In some embodiments, the pressure sensor 104 may be at least partially sealed in the pressure housing 102 by another portion of the housing 101 (e.g., the spacer 114). As depicted, the spacer 114 may form a bulkhead between the electronics housing 110 and the pressure housing 102.

At least a portion of the housing 101 of the pressure transducer 100 comprises a pass-through portion (e.g., a feedthrough portion) including one or more pass-through apertures 118 extending through a portion of the housing 101 (e.g., the pressure housing 102 and the spacer 114). The pass-through aperture 118 may be used to pass a connection (e.g., one or more electrical connections 120) past the pressure housing 102. For example, the electrical connection 120 may extend through the pass-through aperture 118 from another component of the pressure transducer 100 (e.g., another sensor, another electronics assembly, a power source, etc.), and/or a component external to the pressure transducer 100, along the longitudinal axis $L_{100}$ of the pressure transducer 100, along the pressure housing 102 and the spacer 114, and to the electronics assembly 112 in the electronics housing 110. Such a configuration may enable one or more connections to be passed along the longitudinal axis $L_{100}$ of the pressure transducer 100 while being at least partially isolated from the pressure housing 102 (e.g., from the fluid and/or pressure sensor 104 that is at least partially exposed to the exterior environment as discussed above).

Figure 2:
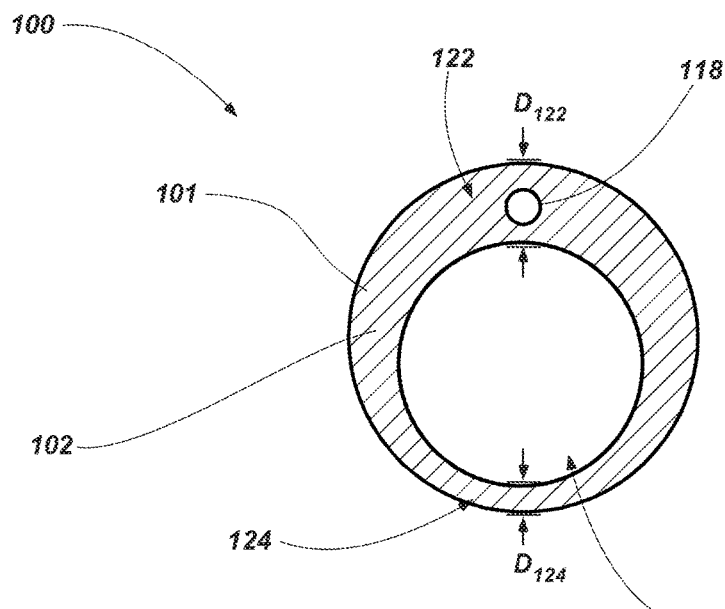
FIG. 2 is another cross-sectional simplified schematic view of the transducer assembly shown in FIG. 1.

FIG. 2 is another cross-sectional simplified schematic view of a portion of the housing 101 (e.g., the pressure housing 102) of the pressure transducer 100 shown in FIG. 1 taken in a direction transverse to the longitudinal axis $L_{100}$ (FIG. 1) of the pressure transducer 100. As shown in FIG. 2, the pressure housing 102 includes the pass-through aperture 118 on one side of the pressure housing 102. The pressure housing 102 also includes the chamber 106 for receiving the pressure sensor 104 (FIG. 1). As depicted, the chamber 106 is laterally offset in the pressure housing 102. For example, the centerline of the chamber 106 (e.g., which may coincide with the longitudinal axis $L_{106}$ of the chamber 106) is offset from the centerline of pressure housing 102 (e.g., which may coincide with the longitudinal axis $L_{100}$ of the pressure transducer 100). As can be seen in FIGS. 1 and 2, the pressure sensor 104 in the chamber 106 will also be offset due to the offset of the chamber 106.

In order to accommodate the pass-through aperture 118 extending through the housing 101, one or more portions of the housing 101 (e.g., the pressure housing 102) may include a first wall portion 122 (e.g., a thick or enlarged walled portion) having a first dimension $D_{122}$ (e.g., width, thickness, taken in a direction transverse (e.g., perpendicular) to the longitudinal axis $L_{100}$ (FIG. 1) of the pressure transducer 100) that is greater than a second dimension $D_{124}$ (e.g., width, thickness, taken in a direction transverse (e.g., perpendicular) to the longitudinal axis $L_{100}$ (FIG. 1) of the pressure transducer 100) of a second adjacent (e.g., opposing) wall portion 124 (e.g., a thin or normal walled portion) of the housing 101. For example, the first wall portion 122 and the second wall portion 124 may be positioned about the chamber 106 (e.g., at opposing sides of the chamber 106) where the walls of the pressure housing 102 extending between the first wall portion 122 and the second wall portion 124 taper between the two thicknesses $D_{122}$, $D_{124}$. As discussed below in greater detail, such varying wall thicknesses may allow the pressure housing 102 to accommodate the pass-through aperture 118 on one side of the pressure housing 102 while still providing a minimum wall thickness surrounding the chamber 106 that can withstand the external forces applied to the pressure housing 102 and/or enable the required connection to (e.g., weld to) another portion of the housing 101 (e.g., the spacer 114 (FIG. 1)).

Figure 3:
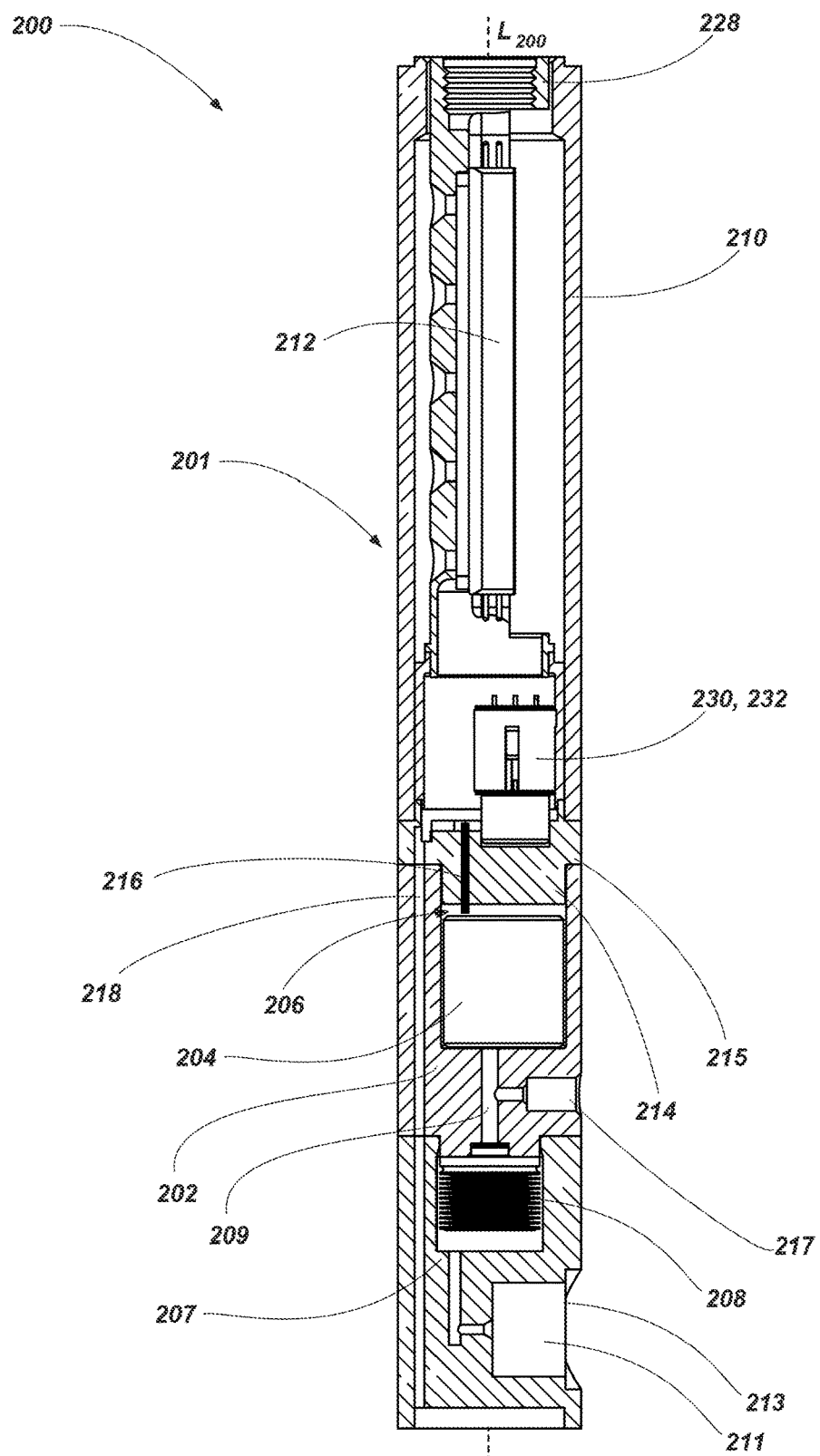
FIG. 3 is a partial cross-sectional view of a transducer assembly in accordance with an embodiment of the present disclosure.

FIG. 3 is a partial cross-sectional view of a transducer assembly (e.g., pressure transducer 200) that may be similar to and include the same or similar features of the pressure transducer 100 shown and described above with reference to FIGS. 1 and 2. As shown in FIG. 3, the pressure transducer 200 may include a pressure housing 202 and one or more pressure sensors 204 disposed in a chamber 206 in the pressure housing 202 that are exposed to the pressure and/or the temperature of the exterior environment. As above, the chamber 206 may be offset from a longitudinal axis $L_{200}$ of the pressure transducer 200 and may be configured to exhibit one or more of an elliptical, annular, cylindrical, and circular shape and/or cross section. The pressure transducer 200 may include a cap (e.g., spacer 214 including a flange portion 215) that is at least partially received in the chamber 206 (e.g., a protrusion of the spacer 214 surrounded by the flange portion 215 is received in the chamber 206) and one or more pass-through pins 216 extending through the spacer 214. The spacer 214 may be coupled to the pressure housing 202 via a welding process coupling at least the flange portion 215 of the spacer 214 to the pressure housing 202, such as that discussed below with reference to FIGS. 6 through 8.

The chamber 206 of the pressure housing 202 may be in fluid communication with one or more isolation elements 208 (e.g., a diaphragm assembly, a bladder assembly, a bellows assembly, as well as combinations of the foregoing) via channel 209. The channel 209 and the chamber 206 may be filled with a fluid (e.g., via fill port 217) that transmits pressure and/or temperature to the pressure sensor 204 from the isolation element 208.

As depicted, the isolation element 208 may be housed in isolation housing 207 that is coupled to the pressure housing 202. For example, the isolation housing 207 may be coupled to the pressure housing 202 via a welding process similar to the welding process coupling the spacer 214 and pressure housing 202 discussed below with reference to FIGS. 6 through 8. In other embodiments, the isolation housing 207 may be otherwise coupled to the pressure housing 202 in any other suitable manner (e.g., via threading).

The isolation element 208 (e.g., bellows) may be in communication with the environment exterior to the pressure transducer 200 via chamber 211. In some embodiments, the chamber 211 may be in communication with the external environment (e.g., a fluid of the wellbore may fill the chamber 211). In other embodiments, the chamber 211 may contain a fluid (e.g., for transmitting pressure to the isolation element 208) that is contained in the chamber 211 and is at least partially isolated from the environment exterior to the pressure transducer 200 with another isolation element 213 (e.g., a diaphragm) positioned in a sidewall of housing 202 of the pressure transducer 200.

As depicted, the pressure transducer 200 may further include an electronics housing 210 that is coupled to the pressure housing 202 (e.g., via the spacer 214). The electronics housing 210 includes an electronics assembly 212 that is at least partially isolated from the fluid within the chamber 206 in the pressure housing 202 that is in communication with the exterior environment. In some embodiments, housing 201 may include one or more attachment features 228 for coupling the pressure transducer 200 to adjacent components in a downhole system (e.g., other downhole monitoring components, communication relays for transmitting power to and data from the pressure transducer 200).

As further depicted in FIG. 3, the pressure transducer 200 may include one or more additional sensors that are utilized along with the pressure sensor 204 to determine and compensate for environmental conditions affecting output of the pressure sensor 204, as well as providing a reference signal. For example, the pressure transducer 200 may include a temperature sensor 230 that is at least partially isolated from (e.g., by the spacer 214 acting as a bulkhead) the fluid within the pressure housing 202 that is in communication with the exterior environment. The temperature sensor 230 is utilized to sense the temperature of the exterior environment (e.g., as is it transmitted to temperature sensor 230 through the housing 201 of the pressure transducer 200 and/or through fluid in the pressure transducer 200) to enable compensation for temperature-induced inaccuracies in the output of pressure sensor 204.

In some embodiments, the pressure transducer 200 may include a reference sensor 232 that is isolated from (e.g., by the spacer 214) the fluid within the pressure housing 202 that is in communication with the exterior environment. As known in the art, an output of such a reference sensor 232 may be utilized for comparison with other sensors (e.g., the pressure sensor 204, the temperature sensor 230, or combinations thereof). For example, one or more of pressure-induced and temperature-induced frequency changes in the one or more of the pressure sensor 204 and the temperature sensor 230 (e.g., in a quartz crystal resonator sensing element of the respective sensors 204, 230) may be detected by monitoring variations in frequency of the sensors 204, 230 with respect to a frequency of the reference sensor 232 (e.g., also including a reference quartz crystal resonator). Data relating to frequency differences detected by the sensors 204, 230, 232 may be manipulated by the electronics assembly 212 or by electrical equipment at the surface of the wellbore to provide pressure and/or temperature data to an operator monitoring wellbore conditions.

At least a portion of the housing 201 of the pressure transducer 200 comprises a pass-through portion including one or more pass-through apertures 218 extending through a portion of the housing 201. For example, the pass-through aperture 218 may extend along the longitudinal axis $L_{200}$ of the pressure transducer 200 through a portion of the housing 201 at least partially exposed to an external environment (e.g., an external pressure), such as, for example, the pressure housing 202, the isolation housing 207 and the spacer 214. As above, the pass-through aperture 218 may be used to pass a connection (e.g., one or more electrical connections 120 (FIG. 1)) from another component of the pressure transducer 200 or from a component external to the pressure transducer 200 along the longitudinal axis $L_{200}$ of the pressure transducer 200, past and along the isolation housing 207, the pressure housing 202, and the spacer 214, and to the electronics assembly 212 in the electronics housing 210. Such a configuration may enable one or more connections to be passed along the longitudinal axis $L_{200}$ of the pressure transducer 200 while being at least partially isolated from the portions of the pressure transducer 200 exposed to the external environment.

Figure 4:
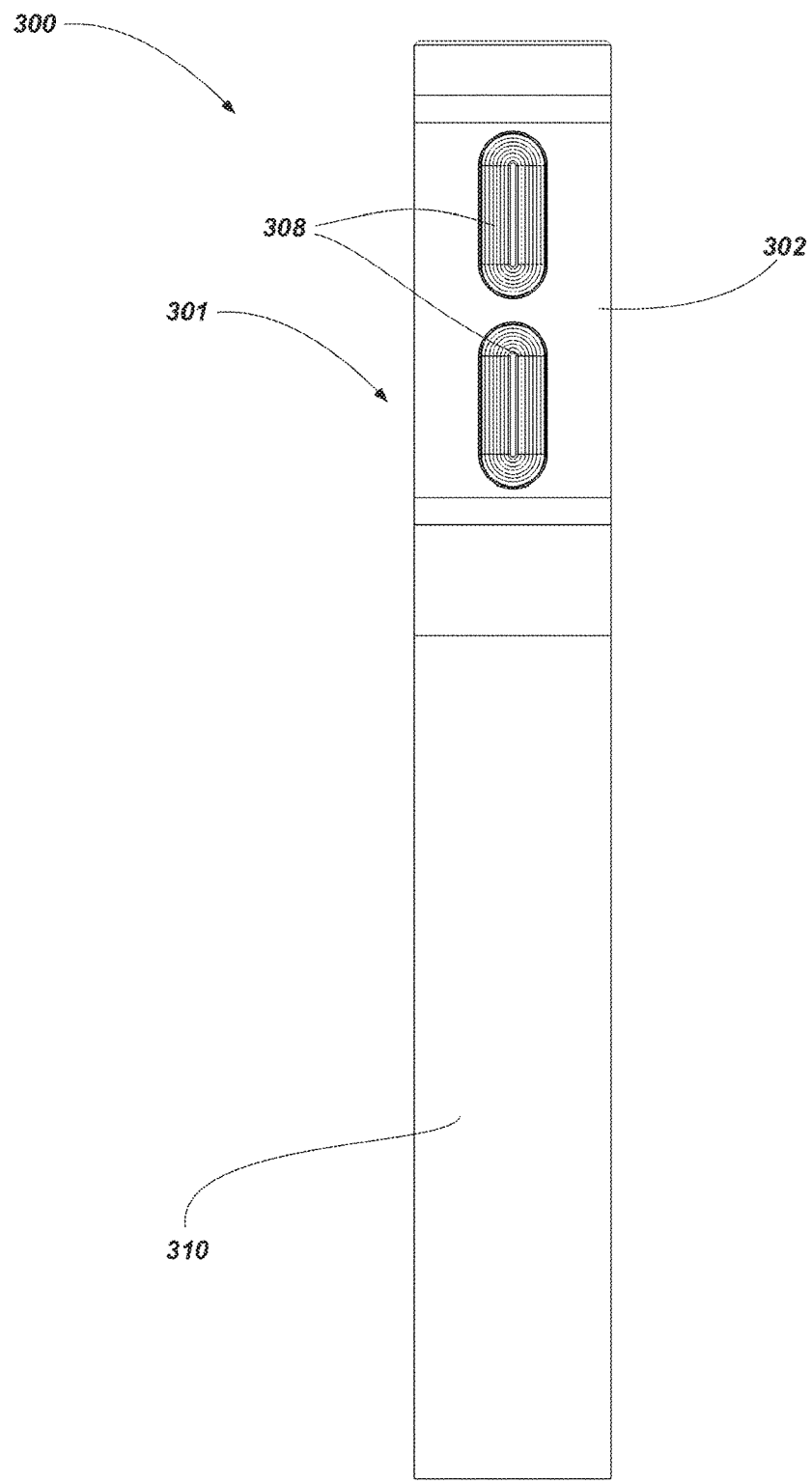
FIG. 4 is a front view of a transducer assembly in accordance with an embodiment of the present disclosure.
Figure 5:
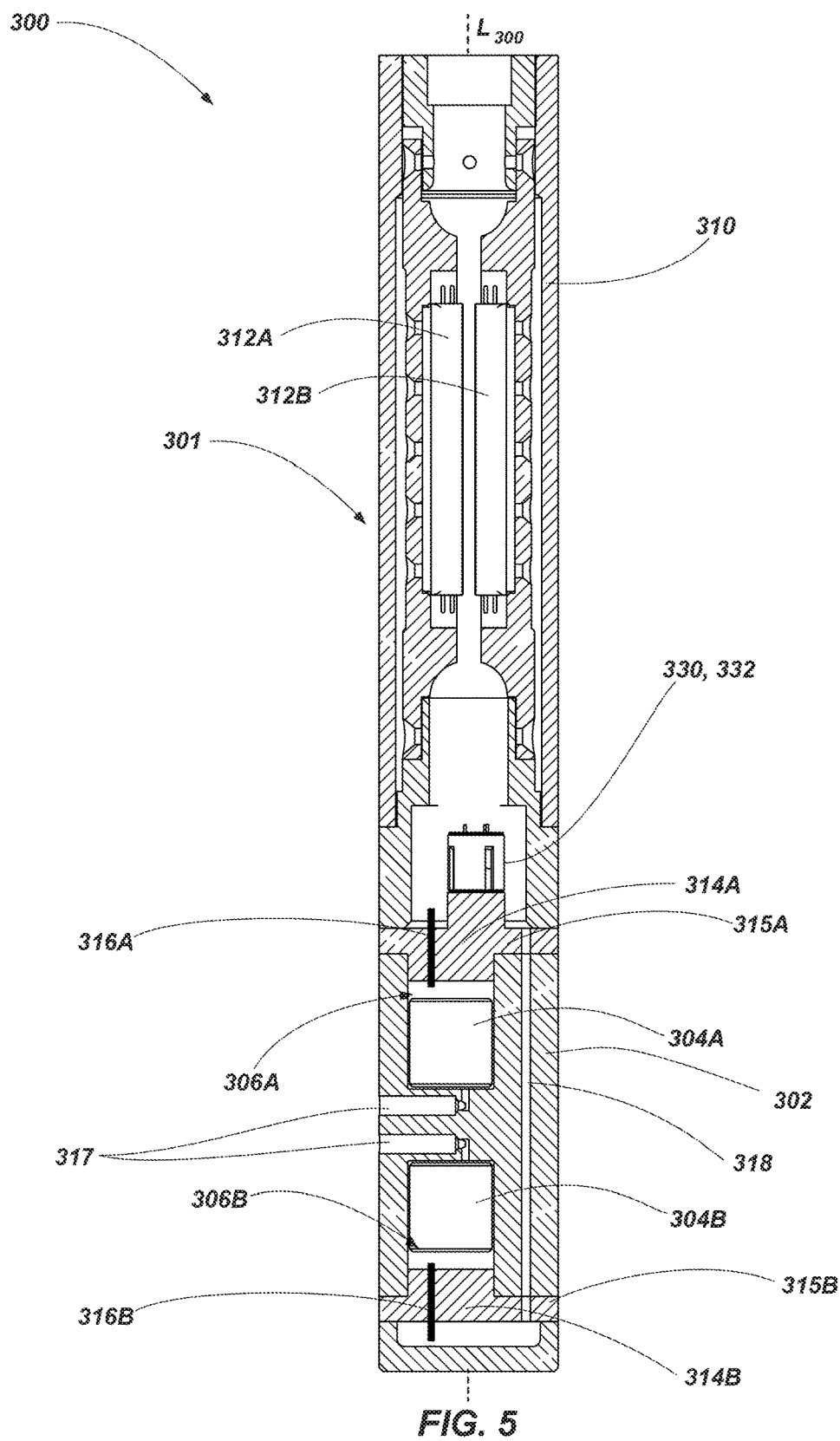
FIG. 5 is a partial cross-sectional view of the transducer assembly shown in FIG. 4.

FIG. 4 is a front view of a transducer assembly (e.g., pressure transducer 300) and FIG. 5 is a partial cross-sectional view of a transducer assembly. In some embodiments, the pressure transducer 300 may be similar to and include the same or similar features of the pressure transducers 100, 200 shown and described above with reference to FIGS. 1 through 3. As shown in FIG. 4, housing 301 of the pressure transducer 300 may include a pressure housing 302, which may include one or more sensors that are at least partially exposed to the exterior environment as discussed below, coupled to an electronics housing 310, which may include electronics and other sensors that are at least partially isolated from the exterior environment as also discussed below.

As depicted, the housing 301 may include one or more isolation elements 308 disposed on an exterior portion (e.g., wall, outer surface) of the housing 301 (e.g., extending through a sidewall of the pressure housing 302) that are also in communication with an interior portion of the housing 301 (e.g., with chambers holding or in communication with sensors as detailed below). In some embodiments, the isolation elements 308 may be diaphragms (e.g., oval diaphragms) such as those described in, for example, U.S. Pat. No. 8,333,117, to Brown et al., the disclosure of which is hereby incorporated herein in its entirety by this reference.

In some embodiments, each isolation element 308 may be in communication with differing portions of the downhole assembly to separately monitor the environmental conditions in the different portions. For example, one isolation element 308 may be in communication with an environment within a string of tubular components (e.g., a production string) positioned in a wellbore annulus and another isolation element may be in communication with an environment in an annulus between the string in the wellbore annulus and the wellbore itself (e.g., between the string and a casing or liner string adjacent the wall of the wellbore).

As shown in FIG. 5, the pressure transducer 300 may include a pressure housing 302 and one or more pressure sensors 304. For example, the pressure transducer includes multiple pressure sensors (e.g., two pressure sensors 304A, 304B) disposed in one or more chambers 306 (e.g., chambers 306A, 306B) in the pressure housing 302 that are both exposed to the pressure and/or the temperature of the exterior environment. As above, each chamber 306A, 306B may be offset from a longitudinal axis $L_{300}$ of the pressure transducer 300 and may exhibit one or more of an elliptical, annular, cylindrical, and circular shape and/or cross section.

The pressure transducer 300 may include one or more caps at either end of the pressure housing 302. For example, spacer 314A including a flange portion 315A may be at least partially received in the chamber 306A and one or more feedthrough pins 316A may extend through the spacer 314A at a first end of the pressure housing 302 proximate the electronics housing 310. Spacer 314B including a flange portion 315B may be at least partially received in the chamber 306B and one or more feedthrough pins 316B may extend through the spacer 314B at a second end of the pressure housing 302 (e.g., opposing the first end) proximate an end of the pressure transducer 300 that may be coupled to one or more other downhole components. Each spacer 314A, 314B may be coupled to the pressure housing 302 via a welding process coupling at least the flange portion 315A, 315B of each spacer 314A, 314B to the pressure housing 302, such as that discussed below with reference to FIGS. 6 through 8.

Each chamber 306A, 306B of the pressure housing 302 may be in fluid communication with the isolation elements 308 (FIG. 4) formed in the sidewall of the pressure housing 302 of the pressure transducer 300. For example, each chamber 306A, 306B may be in communication with one isolation element 308. In some embodiments, each chamber 306A, 306B may extend through a sidewall of the pressure housing 302 to an exterior of the housing 301 and the isolation elements 308 may each extend over a respective chamber 306A, 306B at the outer surface of the housing 301 to seal the chamber 306A, 306B. As above, each chamber 306A, 306B may be filled with a fluid (e.g., via a respective fill port 317) that transmits pressure and/or temperature to the pressure sensor 304A, 304B from the isolation element 308.

As depicted, the pressure transducer 300 may further include electronics housing 310 that is coupled to the pressure housing 302 (e.g., via the spacer 314A). The electronics housing 310 includes an electronics assembly 312A, 312B (e.g., one electronics assembly 312A, 312B for each pressure sensor 304A, 304B) that is at least partially isolated from the fluid within the chamber 306A, 306B in the pressure housing 302 that is in communication with the exterior environment.

The electronics housing 310 of the pressure transducer 300 may include one or more additional sensors that are utilized along with the pressure sensor 304A, 304B to determine and compensate for environmental conditions affecting output of the pressure sensor 304A, 304B, as well as providing a reference signal. The pressure transducer 300 may include a temperature sensor 330 that is at least partially isolated from (e.g., by the spacer 314A acting as a bulkhead) the fluid within the pressure housing 302 that is in communication with the exterior environment.

In some embodiments, the pressure transducer 300 may include a reference sensor 332 that is isolated from (e.g., by the spacer 314A) from the fluid within the pressure housing 302 that is in communication with the exterior environment.

At least a portion of the housing 301 of the pressure transducer 300 comprises a pass-through portion including one or more pass-through apertures 318 extending through a portion of the housing 301. For example, the pass-through aperture 318 may extend along the longitudinal axis $L_{300}$ of the pressure transducer 300 through a portion of the housing 301 at least partially exposed to an external environment (e.g., an external pressure), such as, for example, the pressure housing 302 and the spacers 314A, 314B on either side of the pressure housing 302. As above, the pass-through aperture 318 may be used to pass a connection (e.g., one or more electrical connections 120 (FIG. 1)) from another component of the pressure transducer 300 along the longitudinal axis $L_{300}$ of the pressure transducer 300, past and along the pressure housing 302 and the spacers 314A, 314B, and to one or more of the electronics assemblies 312A, 312B in the electronics housing 310. Such a configuration may enable one or more connections to be passed along the longitudinal axis $L_{300}$ of the pressure transducer 300, while being at least partially isolated from the portions of the pressure transducer 300 exposed to the external environment. For example, an electrical connection between the electronics assembly 312B and the pressure sensor 304B (e.g., which electronics assembly 312B drives and monitors a frequency response of the pressure sensor 304B) may be passed through the pass-through aperture 318 while being isolated from the chambers 306A, 306B.

Figure 6:
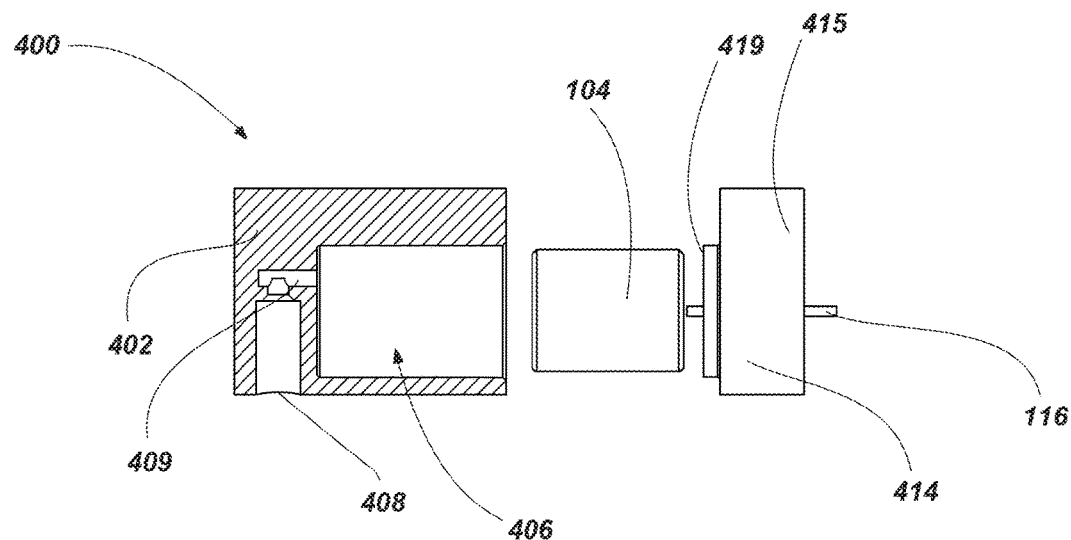
FIG. 6 is an exploded, partial cross-sectional simplified schematic view of a transducer assembly in accordance with an embodiment of the present disclosure.

FIG. 6 is an exploded, partial cross-sectional view of a transducer assembly (e.g., pressure transducer 400) that may be similar to pressure transducers 100, 200, 300 discussed above in relation to FIGS. 1 through 5. As shown in FIG. 6, the pressure transducer 400 may include a pressure housing 402 and one or more pressure sensors 104 disposed in a chamber 406 in the pressure housing 402 that are exposed to the pressure and/or the temperature of the exterior environment. The pressure transducer 400 may include a cap (e.g., spacer 414 including a flange portion 415) that may be at least partially received in the chamber 406 and one or more feedthrough pins 116 extending through the spacer 414. The chamber 406 of the pressure housing 402 may be in fluid communication with one or more isolation elements 408 (e.g., a diaphragm assembly, a bladder assembly, a bellows assembly, as well as combinations of the foregoing) via channel 409.

Figure 7:
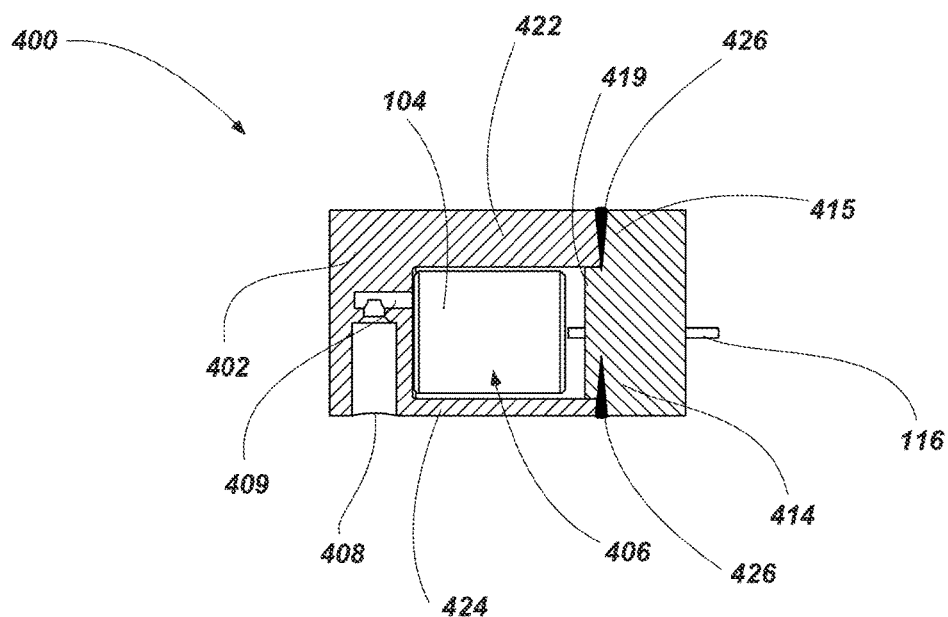
FIG. 7 is a partial cross-sectional simplified schematic view of the transducer assembly of FIG. 6 shown during assembly of the transducer assembly.

FIG. 7 is a partial cross-sectional view of the transducer assembly 400 of FIG. 6 shown during assembly of the pressure transducer 400. As shown in FIG. 7, the pressure sensor 104 is received the chamber 406 in the pressure housing 402. Spacer 414 is attached to the pressure housing 402 at at least the flange portion 415 surrounding a protrusion 419 of the spacer 414 that is received in the chamber 406. For example, spacer 414 is welded to the pressure housing 402 (e.g., along the flange portion 415) to at least partially (e.g., entirely) seal the pressure sensor 104 within the chamber 406. Weld 426 (e.g., weld bead) may be disposed about the pressure transducer 400 at an interface between the spacer 414 and the pressure housing 402. In embodiments where a welded joint is implemented, the welding process may comprise one or more of a gas metal arc welding process (MIG), a gas tungsten arc welding process (TIG), other types of fusion welding process (e.g., an electron-beam welding process (EBW), laser beam welding), and other types of welding.

As depicted, the depth or thickness of the weld 426 may be selected to be larger than is required by the environmental conditions (e.g., pressure and/or temperature) in which the pressure transducer 400 is designed to operate. In other words, the depth or thickness of the weld 426 may be selected to extend a distance greater than the depth or thickness that is required by the maximum pressure and/or temperature in which the pressure transducer 400 is designed to operate. For example, the depth or thickness of the weld 426 may be selected to extend a distance substantially equal to or greater than a thickness (e.g., diameter) of one or more apertures in the pressure housing 402 (e.g., aperture 418 (FIG. 8)). In some embodiments, the depth or thickness of the weld 426 may be selected to extend a distance substantially equal to or greater than the thickness of a first wall portion 422 (e.g., a thick walled portion) of the pressure housing 402 and to substantially exceed the thickness of a second adjacent wall portion 424 (e.g., a thin walled portion) of the pressure housing 402. In some embodiments, the depth or thickness of the weld 426 may be selected to extend a distance substantially equal to or greater than the thickness of a second adjacent wall portion 424 (e.g., a thin walled portion) of the pressure housing 402 plus a thickness or width of an aperture (e.g., aperture 418, discussed below) formed in the first wall portion 422.

Figure 8:
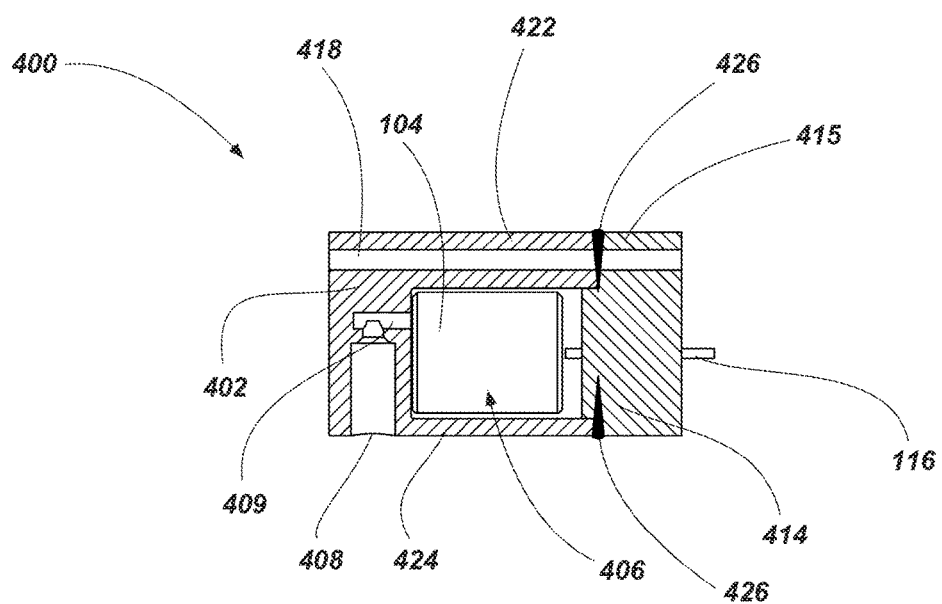
FIG. 8 is a partial cross-sectional simplified schematic view of the transducer assembly of FIGS. 6 and 7 shown during assembly of the transducer assembly.

FIG. 8 is another partial cross-sectional view of the transducer assembly 400 of FIGS. 6 and 7 shown during assembly of the pressure transducer 400. As shown in FIG. 8, after the spacer 414 is welded to the pressure housing 402, one or more apertures 418 may be formed (e.g., machined by drilling, milling, etc.) in and extend along the pressure transducer 400 (e.g., along and through the pressure housing 402, the spacer 414, and a portion of the weld 426 between the spacer 414 and the pressure housing 402). As discussed above, such one or more apertures 418 may be utilized to pass connections (e.g., electrical connections past the pressure housing 402).

In some embodiments, pressure transducers in accordance with the instant disclosure may include methods of fabrication, orientations, quartz structures, electronics, assemblies, housings, reference sensors, and components similar to the sensors and transducers disclosed in, for example, U.S. Pat. No. 6,131,462 to EerNisse et al., U.S. Pat. No. 5,471,882 to Wiggins, U.S. Pat. No. 5,231,880 to Ward et al., U.S. Pat. No. 4,550,610 to EerNisse et al., and U.S. Pat. No. 3,561,832 to Karrer et al., the disclosure of each of which patents is hereby incorporated herein in its entirety by this reference.

As mentioned above, sensors as disclosed herein (e.g., pressure sensors) may comprise a quartz crystal sensing element. In some embodiments, such a pressure transducer having a quartz crystal pressure sensor (e.g., such as that described in U.S. Pat. No. 6,131,462 to EerNisse et al.) may also include a quartz crystal reference sensor and a quartz crystal temperature sensor that are utilized in comparing the outputs of the crystal sensors (e.g., via frequency mixing and/or using the reference frequency to count the signals from the other two crystals) for temperature compensation and to prevent drift and other pressure signal output anomalies. In other embodiments, one or more of the sensors (e.g., the temperature sensor) may comprise an electronic sensor (e.g., a silicon temperature sensor using, for example, integrated electronic circuits to monitor temperature rather than a sensor exhibiting temperature-dependent variable mechanical characteristics (e.g., frequency changes of a resonator element) such as a quartz crystal resonator). For example, the sensor configurations may be similar to those described in U.S. patent application Ser. No. 13/934,058, filed Jul. 2, 2013, the disclosure of which is hereby incorporated herein in its entirety by this reference, which application describes the use of an electronic temperature sensor in a pressure transducer.

In yet additional embodiments, the pressure sensors may comprise a dual-mode sensor configured to sense both pressure and temperature, for example, such as those described in U.S. patent application Ser. No. 13/839,238, filed Mar. 15, 2013, now U.S. Pat. No. 9,528,896, issued Dec. 27, 2016, the disclosure of which is hereby incorporated herein in its entirety by this reference.

Embodiments of the present disclosure may be particularly useful in providing transducers (e.g., pressure transducers) that are at least partially exposed to the exterior environment and still enable the ability to pass connections from one component of the transducer or between multiple transducers or other components through (e.g., within) the housing of the transducer. Conventionally, such connections are required to be passed around one or more portions of a housing of the transducer (i.e., outside and external to the housing of the transducer) that are exposed to the exterior environment (e.g., a pressure housing) due to the structural and/or sealing constraints imposed by such transducers. As will be appreciated, such transducers including external connections generally are required to have relatively larger diameters or cross-sectional areas than transducers in accordance with the instant disclosure that enable the ability to pass conductors through an internal pass-through of the sensor. In downhole applications, such a pass-through portion in a transducer housing may enable the overall size of a transducer assembly to be reduced, enabling other components of a downhole tool to utilize the space and/or enabling more efficient production of current, smaller wellbore diameter wells as well as exploration of new, more challenging formations using so-called "slimhole" drilling techniques with small diameter drilling strings and bottomhole components. For example, relatively smaller transducers also enable the ability to pass wires past the transducer between components above and below such transducers when disposed in a drill string in ways that were not possible before with conventional sized transducers.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure encompasses all modifications, variations, combinations, and alternatives falling within the scope of the disclosure as defined by the following appended claims and their legal equivalents.

What is claimed is:

1. A method of forming a transducer assembly, the method comprising:
   forming a weld bead between a first section to a second section, a lateral width of the weld bead selected to exceed a required width by a selected dimension, the required width selected in view of at least one of a maximum external pressure or a maximum external temperature under which the transducer is designed to operate during use; and
   forming at least one aperture in a housing of the transducer assembly extending along a longitudinal axis of the housing and through the weld bead, the at least one aperture exhibiting a width substantially less than or equal to the selected dimension.

2. The method of claim 1, further comprising extending at least one electrical connection coupled to an electronics assembly of the transducer assembly through the at least one aperture in the housing of the transducer.

3. The method of claim 1, further comprising defining a pressure housing in the transducer assembly at a location offset from a central axis of the transducer assembly.

4. The method of claim 3, further comprising disposing a pressure sensor in the pressure housing that is isolated and laterally spaced from the at least one aperture.

5. The method of claim 4, further comprising enclosing and sealing the pressure sensor in the pressure housing with the weld.

6. A method of forming a transducer assembly, the method comprising:
   coupling a first housing section of the transducer assembly exhibiting a thick wall portion positioned on one lateral side of a chamber for receiving a pressure sensor to a second housing section of the transducer assembly with a weld, the thick wall portion of the first housing section having a lateral width taken in a direction transverse to a longitudinal axis of the transducer assembly that is greater than a lateral width taken in the direction transverse to the longitudinal axis of the transducer assembly of another wall portion; and
   forming at least one aperture in the thick wall portion of the first housing section extending along the longitudinal axis of the transducer assembly, along the chamber, and through the weld.

7. The method of claim 6, further comprising:
   extending at least one electrical connection through the at least one aperture in the first housing section; and
   electrically coupling an electronics assembly of the transducer assembly with another component with the at least one electrical connection.

8. The method of claim 7, wherein electrically coupling an electronics assembly of the transducer assembly with another component with the at least one electrical connection comprises electrically connecting the electronics assembly of the transducer assembly with another pressure sensor of the transducer assembly.

9. The method of claim 6, further comprising positioning the chamber such that a longitudinal axis of the chamber is laterally offset from the longitudinal axis of the transducer assembly and the longitudinal axis of the transducer assembly passes through the chamber.

10. The method of claim 6, further comprising selecting each of the first housing section and the chamber of the first housing section to comprise a substantially elliptical or circular shape, and wherein a centerline of the first housing section is laterally offset from a centerline of the chamber of the first housing section.

11. The method of claim 6, further comprising forming the weld to exhibit a substantially constant lateral width.

12. The method of claim 11, further comprising selecting the lateral width of the weld taken in a direction transverse to the longitudinal axis of the transducer assembly to be greater than or equal to a width selected in view of at least one of a maximum external pressure or a maximum external temperature under which the transducer assembly is designed to operate during use plus a width of the at least one aperture in the thick wall portion of the first housing section.

13. The method of claim 6, further comprising defining the first housing section to contain at least two pressure sensors in respective chambers.

14. The method of claim 13, further comprising extending the at least one aperture in the thick wall portion of the first housing section along each chamber housing the at least two pressure sensors.

15. A method of forming a transducer assembly, the method comprising:
   disposing at least one pressure sensor in a pressure housing, the pressure housing comprising a thick wall portion positioned on one lateral side of the pressure housing, the thick wall portion having a lateral width taken in a direction transverse to a longitudinal axis of the pressure housing that is greater than a lateral width taken in the direction transverse to the longitudinal axis of the pressure housing of another wall portion of the pressure housing positioned on another lateral side of the pressure housing;
   sealing the at least one pressure sensor in the pressure housing with a weld positioned at a first end of the pressure housing; and
   electrically connecting the at least one pressure sensor to an electronics assembly with at least one electrical connection extending through at least one aperture in the thick wall portion of the pressure housing along an entirety of the one lateral side of the pressure housing and through the weld.

16. The method of claim 15, further comprising selecting the at least one pressure sensor to comprise a quartz resonator pressure sensor.

17. The method of claim 15, further comprising defining at least a portion of a lateral width of the weld taken in a direction transverse to the longitudinal axis of the pressure housing is selected to equal a width selected in view of at least one of a maximum external pressure or a maximum external temperature under which the transducer assembly is designed to operate during use plus a width of the at least one aperture in in the thick wall portion of the pressure housing.

18. The method of claim 15, further comprising disposing at least another pressure sensor in a chamber of the pressure housing.

19. The method of claim 18, further comprising electrically connecting the at least another pressure sensor to the electronics assembly with the at least one electrical connection extending through at least one aperture in the thick wall portion of the pressure housing.

* * * * *